US009842058B2

(12) United States Patent
O'Connor et al.

(10) Patent No.: US 9,842,058 B2
(45) Date of Patent: Dec. 12, 2017

(54) LOCKING ENTRIES INTO TRANSLATION LOOKASIDE BUFFERS

(75) Inventors: Dennis M. O'Connor, Chandler, AZ (US); Stephen J. Strazdus, Chandler, AZ (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 13/197,221

(22) Filed: Aug. 3, 2011

(65) Prior Publication Data

US 2011/0296136 A1  Dec. 1, 2011

Related U.S. Application Data

(63) Continuation of application No. 11/092,432, filed on Mar. 29, 2005, now abandoned.

(51) Int. Cl.
G06F 12/02 (2006.01)
G06F 12/1027 (2016.01)
G06F 12/126 (2016.01)

(52) U.S. Cl.
CPC ........ G06F 12/1027 (2013.01); G06F 12/126 (2013.01)

(58) Field of Classification Search
None
See application file for complete search history.

(56) References Cited

U.S. PATENT DOCUMENTS

| | | | |
|---|---|---|---|
| 5,255,384 A | 10/1993 | Sachs et al. | |
| 5,392,410 A | 2/1995 | Liu | |
| 5,412,787 A | 5/1995 | Forsyth et al. | |
| 5,463,750 A * | 10/1995 | Sachs | 711/169 |
| 5,479,627 A | 12/1995 | Khalidi et al. | |
| 5,835,964 A * | 11/1998 | Draves | G06F 12/1036 |
| | | | 711/207 |
| 5,963,984 A | 10/1999 | Garibay, Jr. et al. | |
| 6,418,522 B1 | 7/2002 | Gaertner et al. | |
| 6,760,909 B1 | 7/2004 | Draves et al. | |
| 6,874,077 B2 | 3/2005 | Lyon | |
| 6,941,442 B2 * | 9/2005 | Devereux | G06F 12/126 |
| | | | 711/159 |
| 7,073,173 B1 | 7/2006 | Willman | |
| 7,117,290 B2 | 10/2006 | Shen et al. | |
| 2003/0126371 A1 * | 7/2003 | Venkatraman | G06F 9/3842 |
| | | | 711/137 |
| 2004/0194076 A1 | 9/2004 | Comp et al. | |
| 2004/0221090 A1 | 11/2004 | Ike | |
| 2005/0081020 A1 | 4/2005 | Volp | |
| 2006/0271759 A1 | 11/2006 | Moyer | |
| 2006/0271760 A1 | 11/2006 | Nicolai | |

* cited by examiner

Primary Examiner — Charles Rones
Assistant Examiner — Ryan Dare
(74) Attorney, Agent, or Firm — Dorsey & Whitney LLP

(57) ABSTRACT

Two translation lookaside buffers may be provided for simpler operation in some embodiments. A hardware managed lookaside buffer may handle traditional operations. A software managed lookaside buffer may be particularly involved in locking particular translations. As a result, the software's job is made simpler since it has a relatively simpler, software managed translation lookaside buffer to manage for locking translations.

11 Claims, 2 Drawing Sheets

LOCKING ENTRIES INTO TRANSLATION LOOKASIDE BUFFERS

CROSS-REFERENCE TO RELATED APPLICATIONS

This application is a continuation of U.S. patent application Ser. No. 11/092,432, filed Mar. 29, 2005, now abandoned. This application is incorporated herein by reference, in its entirety, for any purpose.

BACKGROUND

This invention relates generally to computer systems and, particularly, to handling of memory access operations.

To facilitate memory access operations, a translation-lookaside buffer (TLB) is employed by microprocessors to provide the translation of linear addresses to physical addresses. The TLB caches linear addresses and corresponding physical addresses.

In use the TLB is initially accessed to determine whether the TLB contains the physical address corresponding to a linear address, identifying a desired memory location. If the linear address is found within the TLB, a "hit" is said to have occurred. The physical address is merely loaded out of the TLB. If the linear and physical addresses are not cached within the TLB, then a TLB "miss" is said to have occurred. In which case, a page miss handler is used to perform a page table walk to determine the physical address corresponding to the desired linear address.

TLBs allow some entries to be locked. Some performance critical translations may be locked into the TLB to ensure that the slower page table walk operation will not be triggered when one of those translations is needed. However, determining whether there was a place to lock a particular translation often involves a detailed knowledge of the TLB architecture and detailed tracking of the entries that were locked. The architecture of the TLB may limit the kinds of entries that may be locked into it.

Thus, there is a need for better ways to lock entries in translation lookaside buffers.

DETAILED DESCRIPTION

Figure 1:
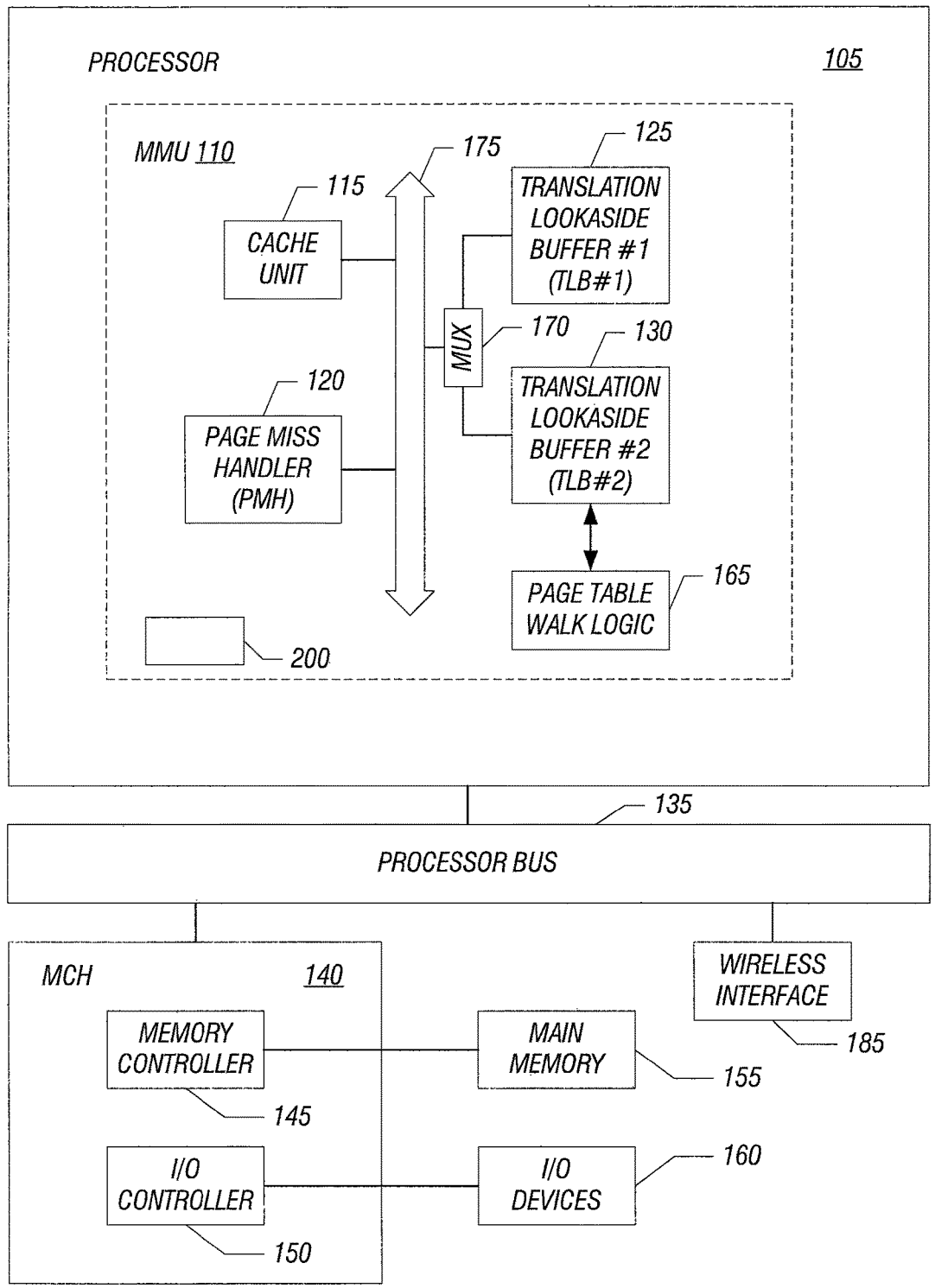
FIG. 1 is a block diagram of one embodiment of the present invention.

A computer system, shown in FIG. 1, includes a processor 105 coupled to a processor bus 135. The processor 105 may be a general purpose microprocessor, a complex instruction set computer, a reduced instruction set computer, a very long instruction word, or a hybrid architecture, to mention a few examples. In one embodiment, the processor 105 is an out-of-order processor capable of performing operations either out of order or speculatively. However, the present invention is applicable to any type of processor, including out-of-order and in-order processors.

Also coupled to the processor bus 135 is a memory controller hub (MCH) 140. The MCH 140 includes a memory controller 145 and an input/output (I/O) controller 150. In the illustrated embodiment, a main memory 155 is coupled to the processor bus 135 through the MCH 140. The processor 105 generates instructions (also referred to herein as micro-operations or "micro-ops"), such as memory loads, stores, and pre-fetches. The micro-ops are, in general, in a sequence that may differ from the sequence in which the instructions appear within a computer program. Micro-ops which involve memory accesses, such as memory loads, stores, and pre-fetches, are executed by a memory management unit (MMU) 110.

The MMU 110 includes, among other things, a cache unit 115, a page miss handler (PMH) 120, a software managed translation lookaside buffer 125, a hardware managed translation lookaside buffer 130 with a page table walk logic 165, the buffers 125, 130 coupled to a central processing unit (CPU) bus 175 by a multiplexer 170. The cache unit 115 may comprise a first level (L0) cache memory and a second level (L1) cache memory. The L0 and L1 cache memories may be integrated into a single device.

Alternatively, the L1 cache memory may be coupled to the processor 105 by a shared bus (not shown).

The main memory 155 and the cache unit 115 store sequences of instructions and data that are executed by the processor 105. In one embodiment, the main memory 155 includes a dynamic random access memory (DRAM); however, the main memory 155 may have other configurations as well.

Additional devices may also be coupled to the memory controller hub 140, such as multiple main memory devices or a wireless interface 185. The interface 185 may be a dipole antenna for example, to enable radio frequency communications. The memory controller 145 coordinates data transfer to and from the main memory 155 at the request of the processor 105 and/or I/O devices 160. Data and/or sequences of instructions, executed by the processor 105, may be retrieved from the main memory 155, the cache unit 115, or other storage devices. A computer system has been described in terms of a single processor; however, multiple processors may be coupled to the processor bus 135.

In operation, the TLB 125 maintains a mapping of address translations between linear addresses and corresponding physical addresses. When a memory access type micro-op is loaded into an execution pipeline, it is intercepted by TLB 125, which performs a lookup to determine whether its internal cache lines contain the physical address corresponding to the linear address of the micro-op. If the address translation is found therein, i.e., if a hit occurs, TLB 125 re-dispatches a micro-op, updated to include the physical address. If a miss occurs, TLB 125 notifies the hardware managed translation lookaside buffer 130. If a hit occurs, the TLB 130 re-dispatches a micro-op, updated to include the physical address. If a miss occurs, the TLB 130 notifies the PMH 120 that a page walk must be performed to determine the physical address corresponding to the linear address of the micro-op. The page table walk may be performed by hardware, microcode, or other types of software.

Initially, a micro-op containing, among other things, information relating to the type of instruction and a sequence number is generated and loaded in a pipeline. Although the processor 105 generates a wide variety of micro-ops, only memory access micro-ops, such as pre-fetch, load, and stored, are handled here.

Figure 2:
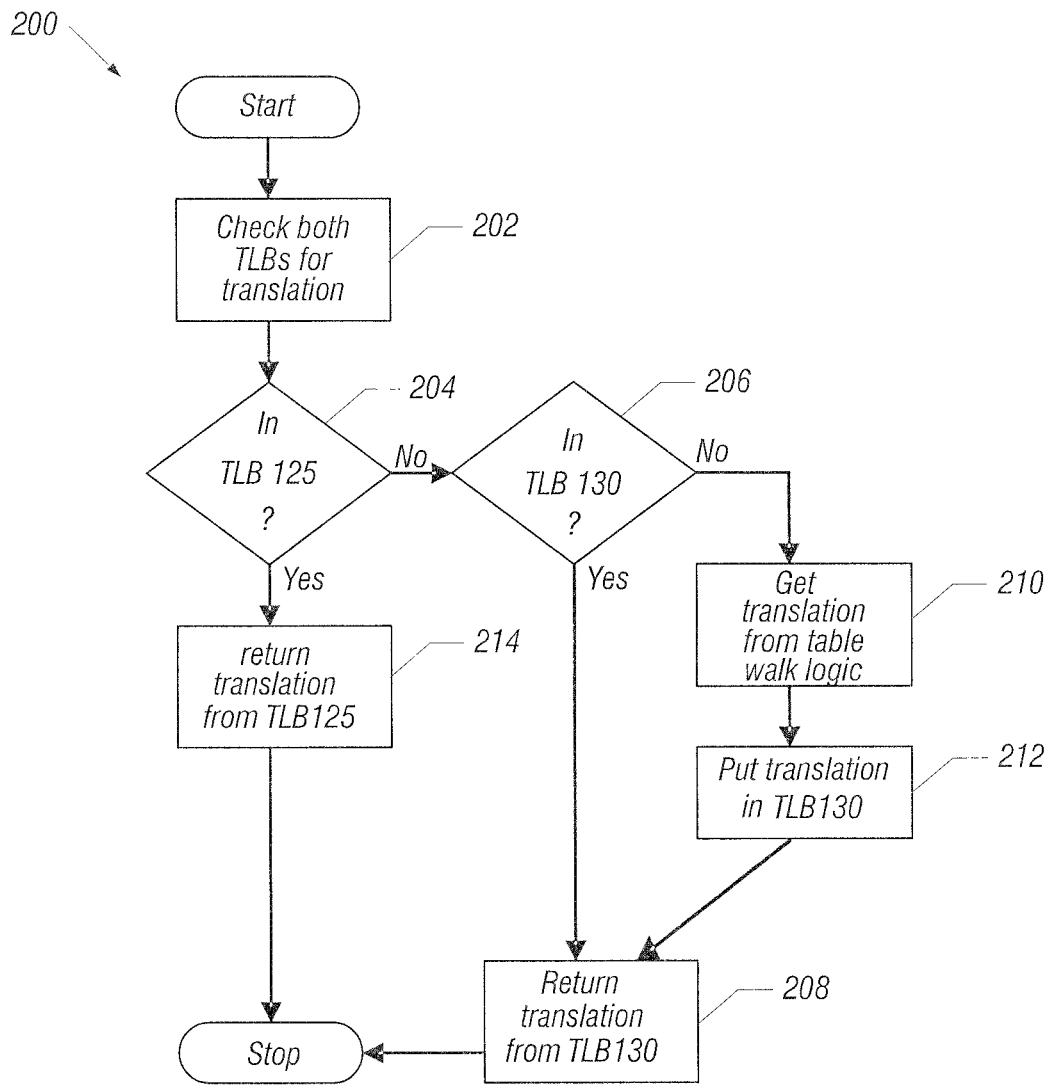
FIG. 2 is a flow chart for the embodiment shown in FIG. 1 in accordance with one embodiment of the present invention.

In one embodiment, software 220, executed by the processor 105 and stored, for example, within the MMU 110, begins as shown in FIG. 2, by checking both TLBs 125 and 130 for a translation (block 202). If the translation is in TLB 125 as determined in diamond 204, the translation is returned from TLB 125 as indicated a block 214.

Otherwise, a check at diamond 206 determines whether the translation is in TLB 130. If so, the translation is returned from TLB 130 as indicated in block 208. If the translation is not found in either TLB, the translation must be obtained from a page table walk logic as indicated in block 210. The translation is then put in the TLB 130, as indicated in block 212, and returned from TLB 130 as indicated in block 208.

The sequence of steps shown in FIG. 2 may also be implemented by hardware or microcode.

TLB 130 is managed primarily by hardware, using any number of known hardware-resident algorithms to decide which translations to put, replace, or invalidate within itself. Software commands to manage TLB 130 may also exist, but may not provide the ability to lock entries into TLB 130 in some embodiments.

TLB 125 is managed entirely via software commands that add and remove entries. TLB 125 can have translations locked into it. The software managed TLB 125 may not use page table walk logic 165. The page table walk logic is only handled by the TLB 130.

In one implementation, TLB 130 may be a 128-entry, 4-way set associative cache. TLB 125 may be an 8-entry, fully-associative cache in one embodiment of the present invention. The TLBs 125 and 130 may also handle different ranges of page sizes.

When a request for translation is passed to the TLBs 125 and 130, both TLBs may be consulted in parallel or sequentially. TLB 125, the software managed TLB, takes precedence in one embodiment. If the requested translation is not found in either TLB, then the hardware managed TLB 130 sends a request to the page table walk logic 165, caches the result according to its hardware resident replacement policies, and returns the translation to the requester. With a processor 105, having elevated security modes, managing the software managed TLB 125 may be restricted to that mode, while less privileged modes may be allowed to manage the hardware managed TLB 130.

In some embodiments of the present invention, the complexity inherent in locking translations in hardware managed TLBs may be avoided. Determining whether there was a place to lock a particular translation in a hardware managed TLB often involves detailed knowledge of the TLB architecture and detailed tracking of the entries that were locked. The architecture of hardware managed TLBs may also limit the kind of entries that can be locked into hardware managed TLBs. For example, only 4-kilobyte pages may be locked in some cases.

In some embodiments of the present invention, the hardware complexity issues may be lessened by using two translation lookaside buffers, coupled together by a simple mechanism. Thus, the software's job of locking translations may be made simpler, in some embodiments, because it has a more flexible translation lookaside buffer to manage without having to be concerned about interaction with the hardware managed translation lookaside buffer.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
receiving a request for a translation from a linear to physical address from an execution pipeline;
checking an entirely software managed translation lookaside buffer, wherein the entirely software managed translation lookaside buffer is configured to use software commands to add and remove entries, to determine whether or not the translation is resident therein, and to lock translations;
responsive to the translation being determined to be resident in the entirely software managed translation lookaside buffer, returning the physical address to the execution pipeline from the entirely software managed translation look aside buffer;
responsive to the translation being determined to be not resident in the entirely software managed translation look aside buffer, checking an entirely hardware managed translation lookaside buffer, wherein the entirely hardware managed translation lookaside buffer is configured to use a hardware resident algorithm to decide what translations to store, to determine whether or not the translation is resident therein;
responsive to the translation being determined to be resident in the entirely hardware managed translation lookaside buffer, returning the physical address to the execution pipeline from the entirely hardware managed translation lookaside buffer;
responsive to the translation being determined to be not resident in the entirely hardware managed translation lookaside buffer, using a page walk logic to determine the physical address corresponding to the linear address; and
managing the software managed translation lookaside buffer in a more elevated security mode than said hardware managed translation lookaside buffer.

2. The method of claim 1 including providing a page table walk logic handled by said hardware managed translation lookaside buffer.

3. The method of claim 1 including, if said translation is not in said hardware managed translation lookaside buffer, obtaining the translation from a page table walk logic.

4. The method of claim 3 including returning the translation from the page table walk logic to said hardware managed translation lookaside buffer.

5. A non-transitory storage medium storing instructions that, if executed, enable a processor-based system to:
search in an entirely software managed translation lookaside buffer that uses software commands to add and remove entries for a translation from a linear to a physical address, and to lock translations;
based on the translation being resident in the entirely software managed translation lookaside buffer, return the physical address to an execution pipeline;
based on the translation not being resident in said entirely software managed translation lookaside buffer, search for said translation in an entirely hardware managed translation lookaside buffer; and
based on the translation being resident in the entirely hardware managed translation lookaside buffer, return the physical address to the execution pipeline,
wherein said entirely hardware managed translation lookaside buffer uses a hardware resident algorithm to decide what translations to store, and wherein said entirely hardware managed translation lookaside buffer is operated at a lower security mode than said entirely software managed translation lookaside buffer when a request for a translation from a linear to physical address is received, check the entirely software managed translation lookaside buffer to determine whether or not the translation is resident therein before checking said entirely hardware managed translation lookaside buffer; and storing instructions that, if executed, enable a processor-based system to manage the entirely software managed translation lookaside buffer in a restricted mode and to manage the entirely hardware managed translation lookaside buffer in a less privileged mode than the entirely software managed translation lookaside buffer.

6. The medium of claim 5 further storing instructions that, if executed, enable a processor-based system to obtain translations from a table walk logic exclusively via the entirely hardware managed translation lookaside buffer instead of said entirely software managed translation lookaside buffer.

7. The medium of claim 5 further storing instructions that, if executed, enable a processor-based system to return a translation from a page table walk logic to said hardware managed translation lookaside buffer.

8. A system comprising:
a processor;
a memory management unit coupled to the processor via a processor bus, the memory management unit comprising a pair of translation lookaside butters coupled to the processor bus via a multiplexer, and a page table walk logic coupled to only one of the translation lookaside buffer of the pair of translation lookaside buffers,
wherein one of said buffers is an entirely software managed translation lookaside buffer that uses software commands to add and remove entries, and to lock translations, only one of said buffers having page table walk logic, and the other one of said buffers is an entirely hardware managed translation lookaside buffer that uses a hardware resident algorithm to decide what translations to store, and wherein the page table walk logic is coupled to the entirely hardware managed translation lookaside buffer,
wherein in response to a request for a translation from a linear address to physical address is received from an execution pipeline said software managed translation lookaside buffer is consulted first and returns the physical address to the execution pipeline if the translation is in said software managed translation lookaside buffer, and only if the translation is not in said software managed translation lookaside buffer is said hardware managed translation lookaside buffer checked for the translation and returns the physical address to the execution pipeline if the translation is in said hardware managed translation lookaside buffer, and wherein only said entirely hardware managed translation lookaside buffer accesses said page walk logic if the translation is not in said hardware managed translation lookaside buffer; and
wherein said software managed translation lookaside buffer is managed in a restricted mode and to manage said hardware managed translation lookaside buffer in a less privileged mode than said software managed translation lookaside buffer.

9. The system of claim 8 wherein the page table walk logic is coupled exclusively to said hardware managed translation lookaside buffer.

10. The system of claim 9 wherein the software managed translation lookaside buffer determines whether or not the translation is resident therein before said hardware managed translation lookaside buffer is checked for said translation.

11. The system of claim 10 wherein said page table walk logic returns a translation from the page table walk logic to said hardware managed translation lookaside buffer in response to said entirely hardware managed translation lookaside butter accessing said page walk logic if the translation is not in said hardware managed translation lookaside buffer.

* * * * *